(12) United States Patent
Pellenc et al.

(10) Patent No.: US 8,028,825 B2
(45) Date of Patent: Oct. 4, 2011

(54) HANDLING DEVICE WITH FLEXIBLE LINK CHAINS AND BARS

(75) Inventors: Roger Pellenc, Pertuis (FR); Jean-Marc Gialis, Cheval Blanc (FR)

(73) Assignee: Pellenc (Societe Anonyme), Pertuis (FR)

( * ) Notice: Subject to any disclaimer, the term of this patent is extended or adjusted under 35 U.S.C. 154(b) by 28 days.

(21) Appl. No.: 12/199,739

(22) Filed: Aug. 27, 2008

(65) Prior Publication Data

US 2009/0057107 A1 Mar. 5, 2009

(30) Foreign Application Priority Data

Aug. 30, 2007 (FR) ...................................... 07 06082

(51) Int. Cl.
*B65G 17/06* (2006.01)
(52) U.S. Cl. ........................................ 198/853; 198/851

(58) Field of Classification Search ................... 198/851, 198/853
See application file for complete search history.

(56) References Cited

U.S. PATENT DOCUMENTS

| 1,589,059 | A | * | 6/1926 | Fink et al. | 414/16 |
| 2,631,465 | A | * | 3/1953 | Cordis | 474/220 |
| 3,099,346 | A | * | 7/1963 | Maas | 198/733 |
| 3,815,725 | A | * | 6/1974 | Linderman | 198/851 |
| 5,415,272 | A | * | 5/1995 | Boschert et al. | 198/780 |
| 5,573,470 | A | * | 11/1996 | Jakob | 474/255 |
| 6,036,002 | A | * | 3/2000 | Kobayashi et al. | 198/853 |

* cited by examiner

*Primary Examiner* — Gene Crawford
*Assistant Examiner* — Kavel Singh
(74) *Attorney, Agent, or Firm* — Egbert Law Offices PLLC

(57) ABSTRACT

Handling device of the present invention includes spaced-out transverse bars connected through their ends to endless lateral drive chains made of links. The chains include a series of flexible links connected through bars.

15 Claims, 13 Drawing Sheets

HANDLING DEVICE WITH FLEXIBLE LINK CHAINS AND BARS

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

This invention concerns a handling device with flexible link chains and bars, intended among other things, for the conveying of crops. More specifically, but not limited thereto, this handling device can be advantageously used on grape harvesting machines, on potato or carrot picking machines for the conveying of the crop. However, other agricultural or industrial applications are possible.

2. Description of Related Art Including Information Disclosed Under 37 CFR 1.97 and 37 CFR 1.98

Harvesting machines (such as French Patent document FR-2.795.599) are well-known. The machines use a harvest conveyor comprising spaced-out bars connected through their ends to lateral endless drive chains made of metallic links connected to one another through a hinge pin. The disadvantages of this type of conveyor are the following:
- not to be removable so that is it is not easy to replace damaged links or bars;
- rather noisy operation;
- frequent lubrication required; and
- being rather complex and therefore costly to assemble.

Handling chains are also well-known in which the ends of the spaced-out transverse bars are attached through riveting or vulcanization onto two flexible and notched lateral conveyor belts.

Those handling systems have several major disadvantages, including:
- large winding diameter;
- high cost; and
- not being removable.

BRIEF SUMMARY OF THE INVENTION

The purpose of the invention includes proposing a solution to the problems caused by the above-mentioned disadvantages.

Under the invention, this goal is achieved using a handling device with lateral endless chains made of a series of flexible links connected through bars.

Under another characteristic arrangement, the flexible links of the lateral chains and the transverse bars are connected by a removable assembly system.

According to another advantageous arrangement, the flexible links of the lateral chains are connected through a rigid assembly system.

According to a preferred embodiment, at least the terminal portions of the bars have a non-rotating section, for example, a polygonal or ellipsoidal section, preferably a square section and fit into ports of a complementary shape provided on the ends of the flexible links, so that the latter are connected through a rigid assembly.

According to a very advantageous embodiment, the flexible links consist of a flexible internal armature made of a high tensile strength flexible braid (achieved with metallic wires or synthetic fibers) and whose opposite ends have a loop in which a rigid eyelet is positioned to attach one of the ends of a bar, the armature thus achieved being covered with a flexible coating acting as running surface.

The flexible links thus achieved have the peculiarity and advantage of being sufficiently flexible to be able to wind on small winding diameters or arcs, while showing tensile rigidity so that they do not incur any significant elongation when used. The inside armature is used as a neutral fiber and ensures the tensile strength of the chain and limits the elongation of the assembly.

According to a first interesting embodiment, the removable attachment system of the bars on the flexible links is a U-shaped fork-clip comprising two flat branches and a bottom, lapping over the bar ends, with one branch at least provided with means cooperating with a complementary arrangement of said ends and link eyelet ports to make up this removable attachment.

According to one efficient embodiment, the open ends of the fork-clip branches are bent back outward so as to constitute a return opposing the transverse sliding of the flexible links in the direction of the central part of the conveyor.

According to another interesting embodiment, at least one branch of the fork-clip is equipped with a lug or boss oriented inward and placed closed to its end, such boss cooperating with an indentation or cavity in the bars close to their ends, so as to prevent any axial movement of said fork-clip in an outward direction from the conveying device.

According to another advantageous embodiment, at least one of the branches of the fork-clip is equipped with a flexible tab protruding on its outside face and extending in the direction of its bent-back end. The flexible tab cooperates with a notch made in the internal surface of the holes on the flexible link eyelets, so as to prevent any transverse outward sliding of the external links and therefore also of the internal links mounted on the ends of the bars.

According to a second advantageous embodiment, the means of removable attachment of the bar in the flexible link eyelets consist of a "under the skin" linking system including a self-tapping screw screwing both into the end of said bars and into the wall delimiting the port of said eyelets into which said end fits.

In addition to their removable nature, making it possible to replace a damaged link or bar, the handling devices under the invention also have as an advantage of an easy mounting that should permit lower fabrication costs compared to similar systems.

According to another characteristic arrangement, the flexible links comprise, on one of their lateral faces, a bulge between their ends provided with bar mounting eyelets.

This shape permits inversion of the position of the flexible links by staggering them and thus limiting the width and space taken by the lateral chains. In certain constructive applications, it can also promote proper guiding of the chains.

BRIEF DESCRIPTION OF THE SEVERAL VIEWS OF THE DRAWINGS

The above purposes, characteristics and advantages and many more will become clearer from the description below and the attached drawings.

FIG. 8b is a sectional view along line A-A from FIG. 8a.

DETAILED DESCRIPTION OF THE INVENTION

Said drawings are also referred to in order to describe two interesting, although not limiting, embodiments of the handling device under the invention.

On the attached drawings, the identical components that fulfill the same functions in the two embodiments shown bear the same reference numbers.

Figures 1A, 1B:
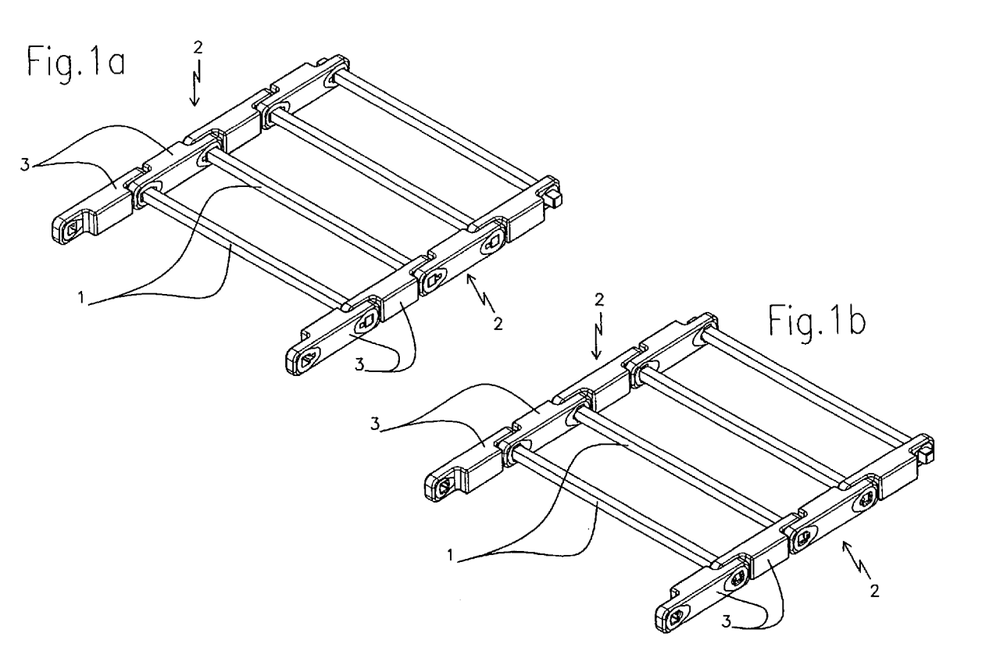
FIG. 1A is a perspective view of a portion of a conveyor system under the invention, according to a first embodiment.
FIG. 1B is a similar perspective view showing a second embodiment of this conveyor device.

As shown especially on FIGS. 1A and 1B, this handling device is of the type comprising multiple spaced-out parallel bars 1, mounted between two endless lateral chains 2 consisting of multiple links 3.

Under the invention, the links 3 permitting the linking between the various bars 1 are flexible and advantageously made of four parts:

First, a flexible armature 4 consists of a very high tensile strength flexible braid, for example, a flat braid made of steel wire or glass fiber yarn or carbon yarn or aramid yarn or other synthetic fiber yarn, such as DYNEEMA™, SPECTRA™ or others that may be sewn, glued, welded together, etc. The braid that initially may come in the form of a tape, can for example consist of a flattened winding, comprising an elongated central portion 4a and loop-shaped ends 4b. This flexible armature 4 makes up the neutral fiber of the flexible link.

Second, two eyelets 5 made out of a rigid material (metal or plastic) are housed without significant clearance inside the end loops 4b of the flexible armature 4. The peripheral outside surface 5a of these eyelets act as support to said loops. The cross-section of the port 5b on these eyelets, designed for the insertion of the ends of the bars 1, is based on the cross-section of the ends of said bars. It can advantageously be polygonal, preferably square. It can also be circular or alike.

Third, an outside flexible coating 6, acts as running surface. This coating can, for example, be made of polyurethane, or another flexible plastic or rubber. It can be over-molded onto the assembly consisting of the flexible armature 4 and the two eyelets 5 or molded separately and then be added onto said assembly.

The flexible links 3 thus achieved comprise advantageously on one of their lateral faces a bulge 3a of an overall parallelepiped shape, located between their opposite ends 3b provided with bar 1 mounting eyelets 5.

This shape permits to reverse alternatively the position of the flexible links 3, which permits to obtain a uniform width of the lateral chains 2 and to limit the space required by the latter.

Bars 1 are used to connect the links 3 to one another and to determine the width of the conveyor belt. In addition, they allow for the drive of said belt through toothed wheels and for the attachment of various tools based on the work for which said conveyor belt is intended.

The bars 1 can be made out of any rigid materials suitable for the use of the handling device, for example, stainless steel, plastics, composites, or out of mixtures of several of those materials. Their cross-section can be either solid or hollow and of various shapes, for example square, hexagonal, cylindrical, tubular, etc. In the case of a polygonal cross-sectional shape, the edges can be bull-nosed, chamfered or square corner.

Advantageously, at least the terminal portions 1a of the bars 1 have a non rotating section, for example, a polygonal or ellipsoidal section, preferably a square section and are inserted into ports 5b of a complementary shape provided on the ends 3b of the links 3, so that the latter are connected through a rigid assembly.

However, according to an interesting arrangement, the bars 1 also have in their part comprised between their two ends, a non-rotating section, preferably a square section, permitting the precise fixed positioning of tools or components designed to carry out a given task, onto said bars through socketing, over-molding or otherwise; such tools consisting, for example, of scrapers, cups, anvils, screen blades, etc., depending on the duty assigned to the handling device.

FIGS. 12 through 15 show examples of the mounting of such equipment onto the bars of the conveyor under the invention.

Figure 12:
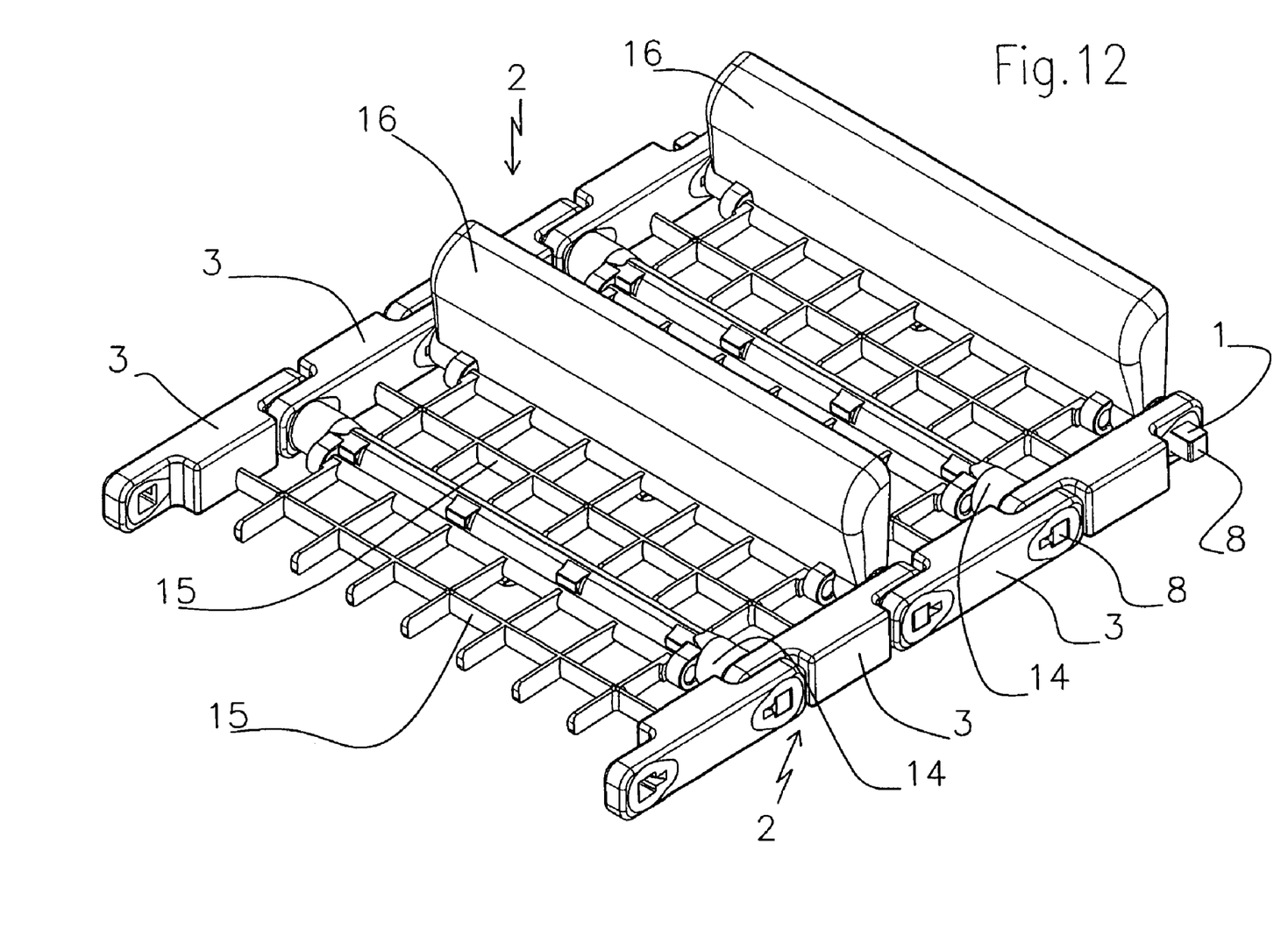
FIGS. 12 through 15 are perspective views of portions of conveyors showing a few examples of mounting of functional components onto the transverse bars of the latter.

On FIG. 12, a perforated plate 15 is mounted with a limited amplitude pivoting capacity onto each bar 1. Furthermore, a transverse cup 16 is also mounted, but in a fixed manner, onto every other bar only.

Figure 13:
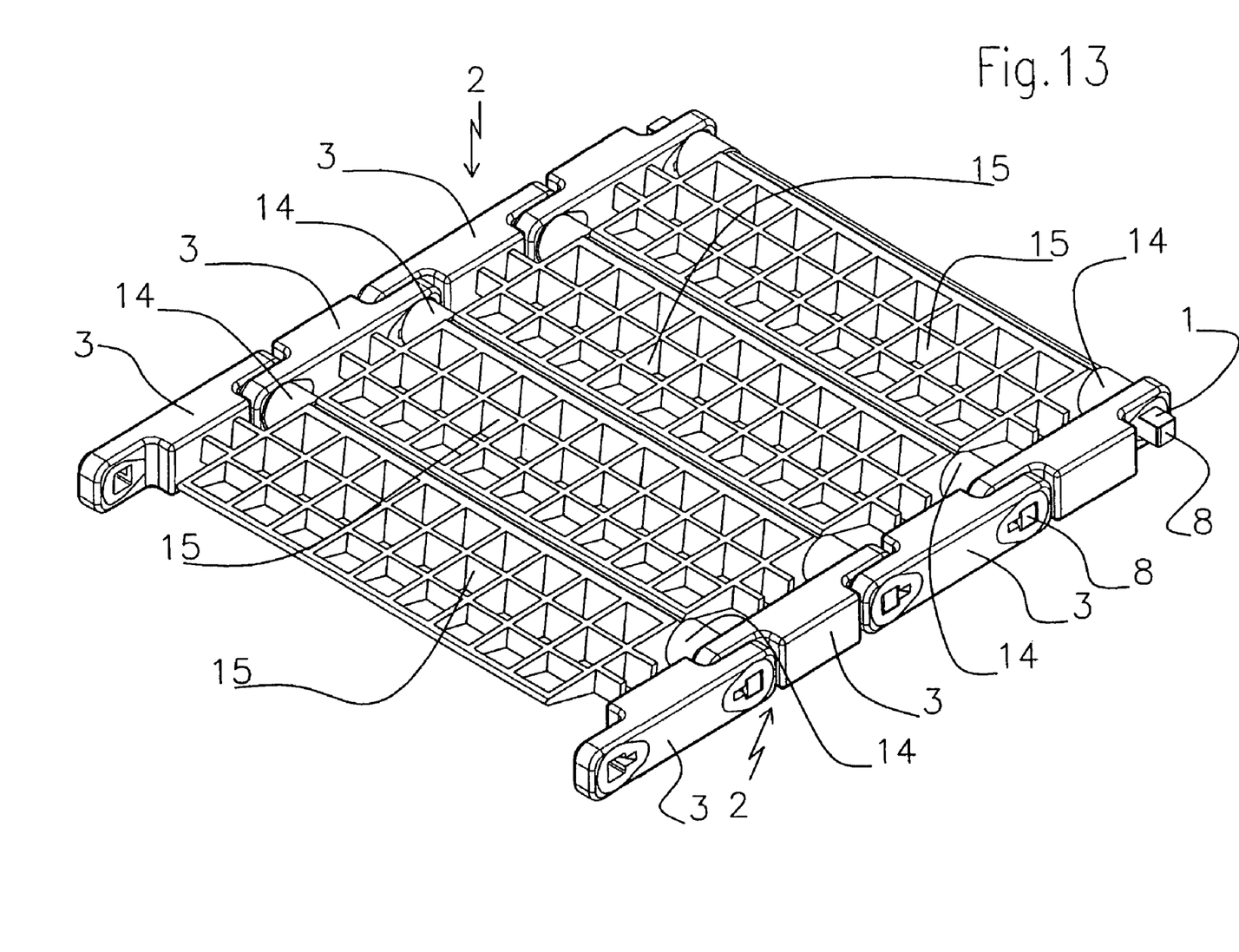

The conveyor shown on FIG. 13 is uniquely equipped with perforated plates 15 mounted with a pivoting capacity over all bars 1.

Figure 14:
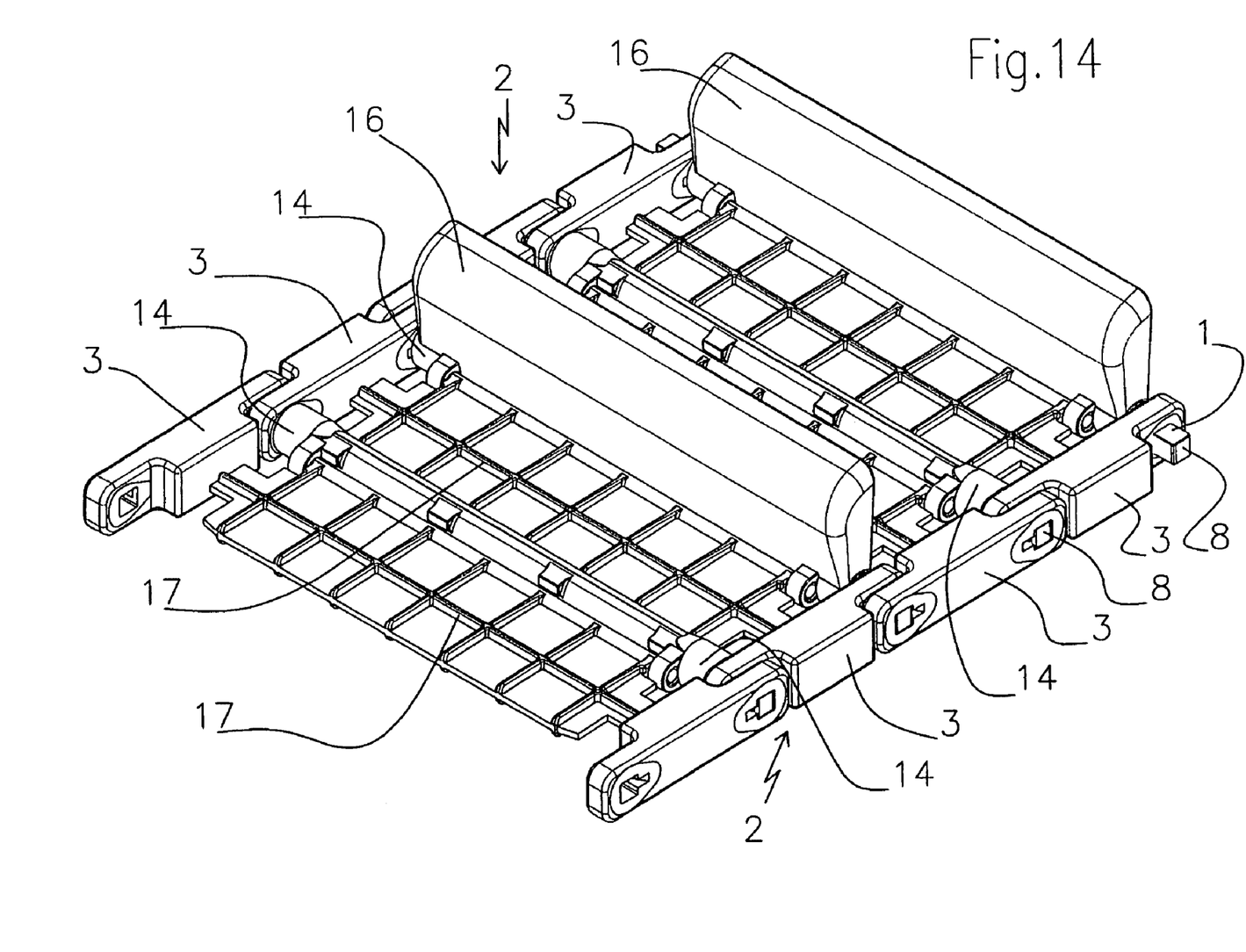

On FIG. 14, a solid plate 17 is mounted with a limited amplitude pivoting capacity onto each bar 1. Furthermore, a transverse cup 16 is also mounted in a fixed manner, onto every other bar only.

Figure 15:
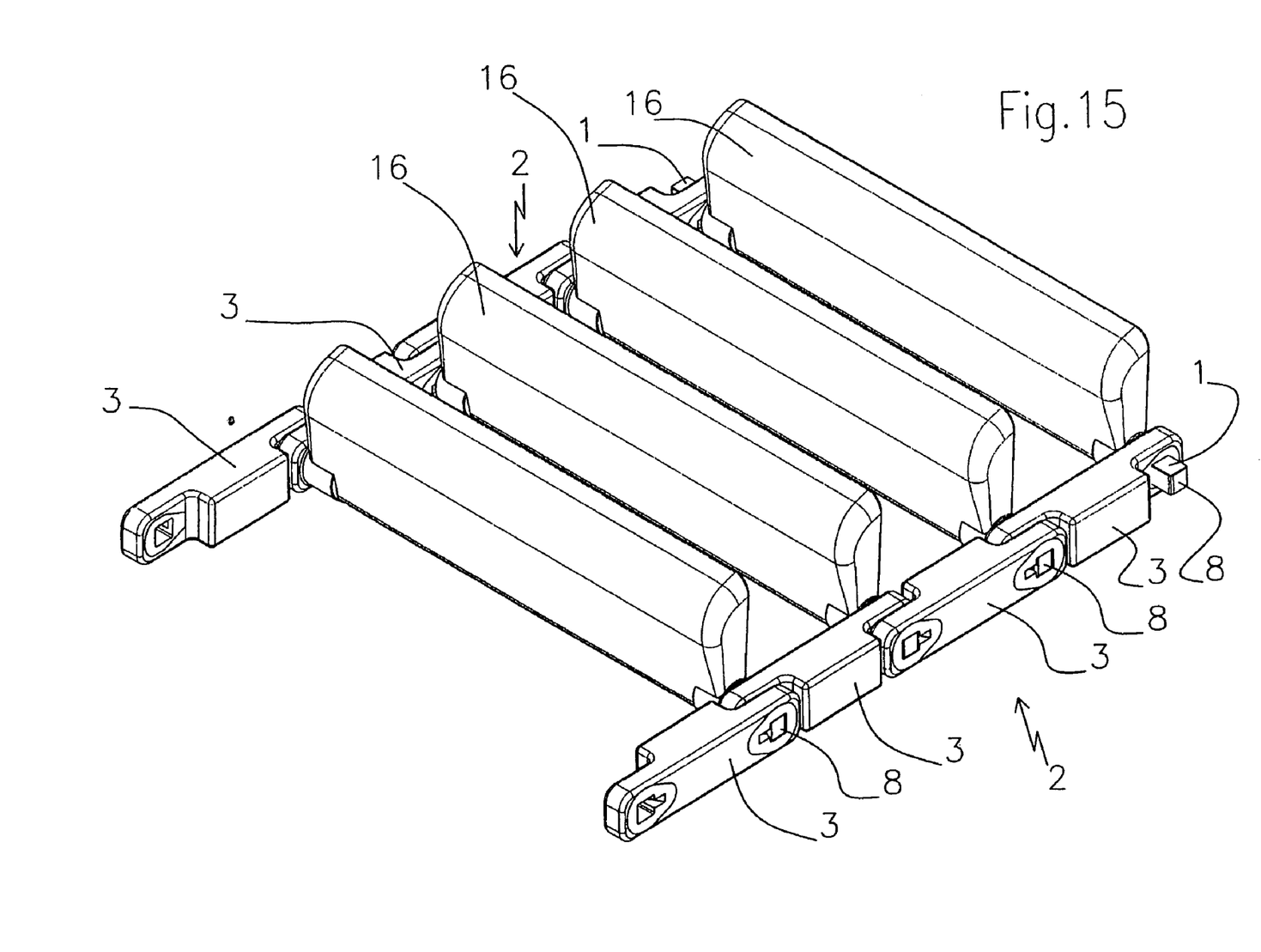

The conveyor shown on FIG. 15 is uniquely equipped with transverse cups 16 mounted on all bars 1.

In certain applications, the cups 15 can act as anvils or be replaced by anvils or scrapers.

The perforated plates 15 or solid plates 17 can be of the pivoting type (as indicated above) or not.

Figures 2A, 2B, 2C:
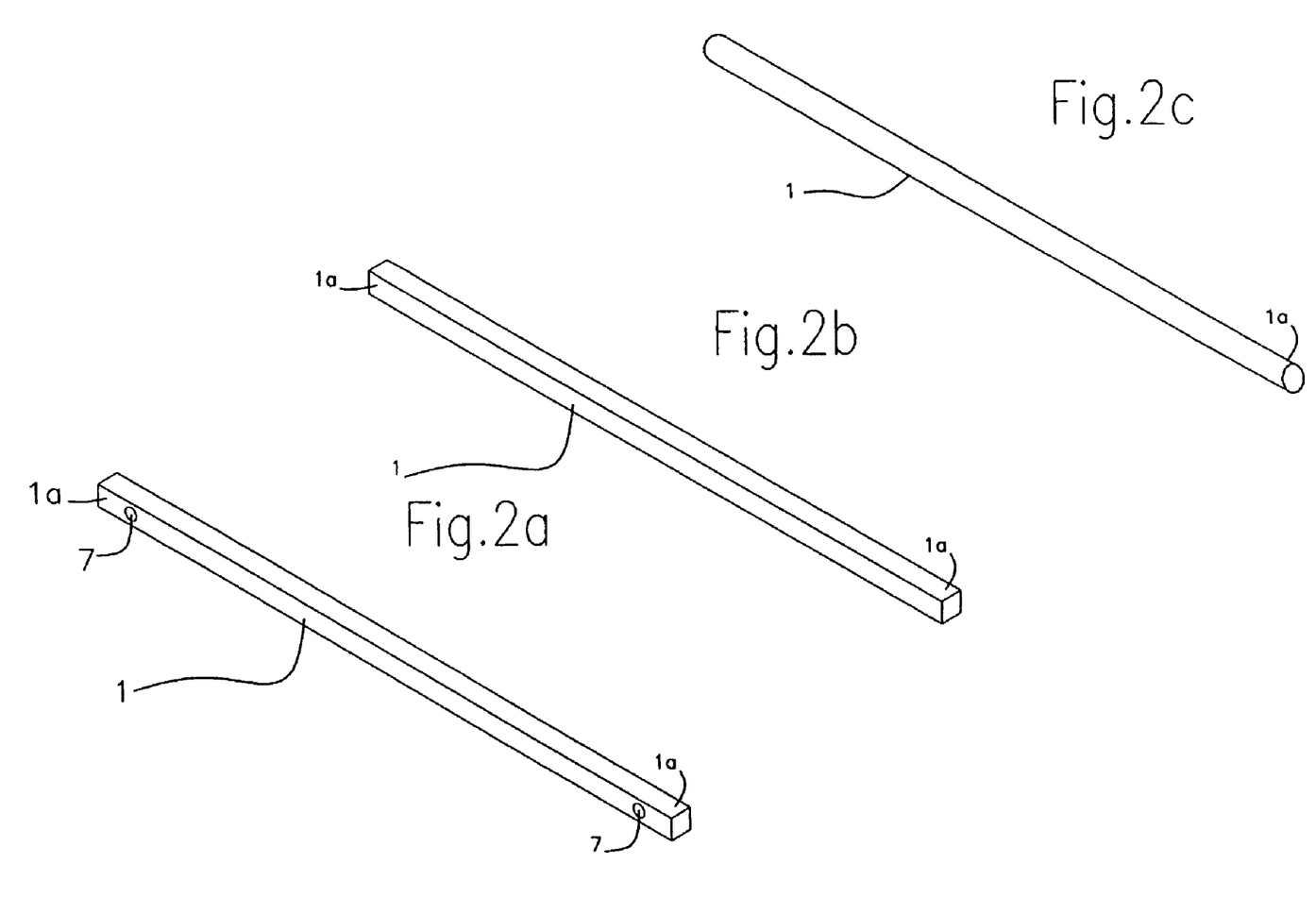
FIGS. 2a,2b,2c are perspective views showing three embodiments of this device transverse bars.
Figures 3A, 3B:
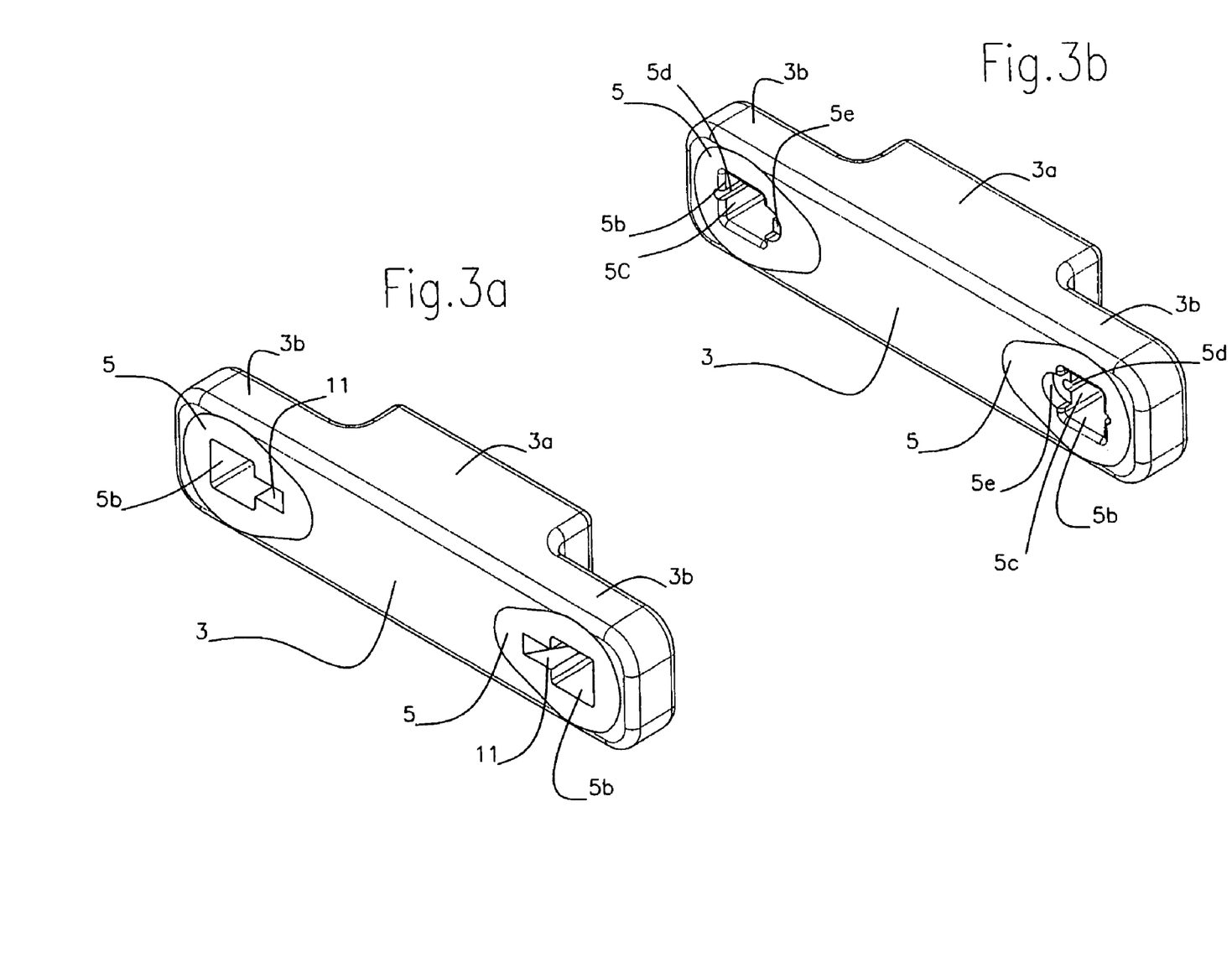
FIG. 3A is a perspective view of one of the links making up the lateral endless chains of the device according to the first embodiment.
FIG. 3B is a similar perspective view showing a link according to the second embodiment.
Figures 4A, 4B:
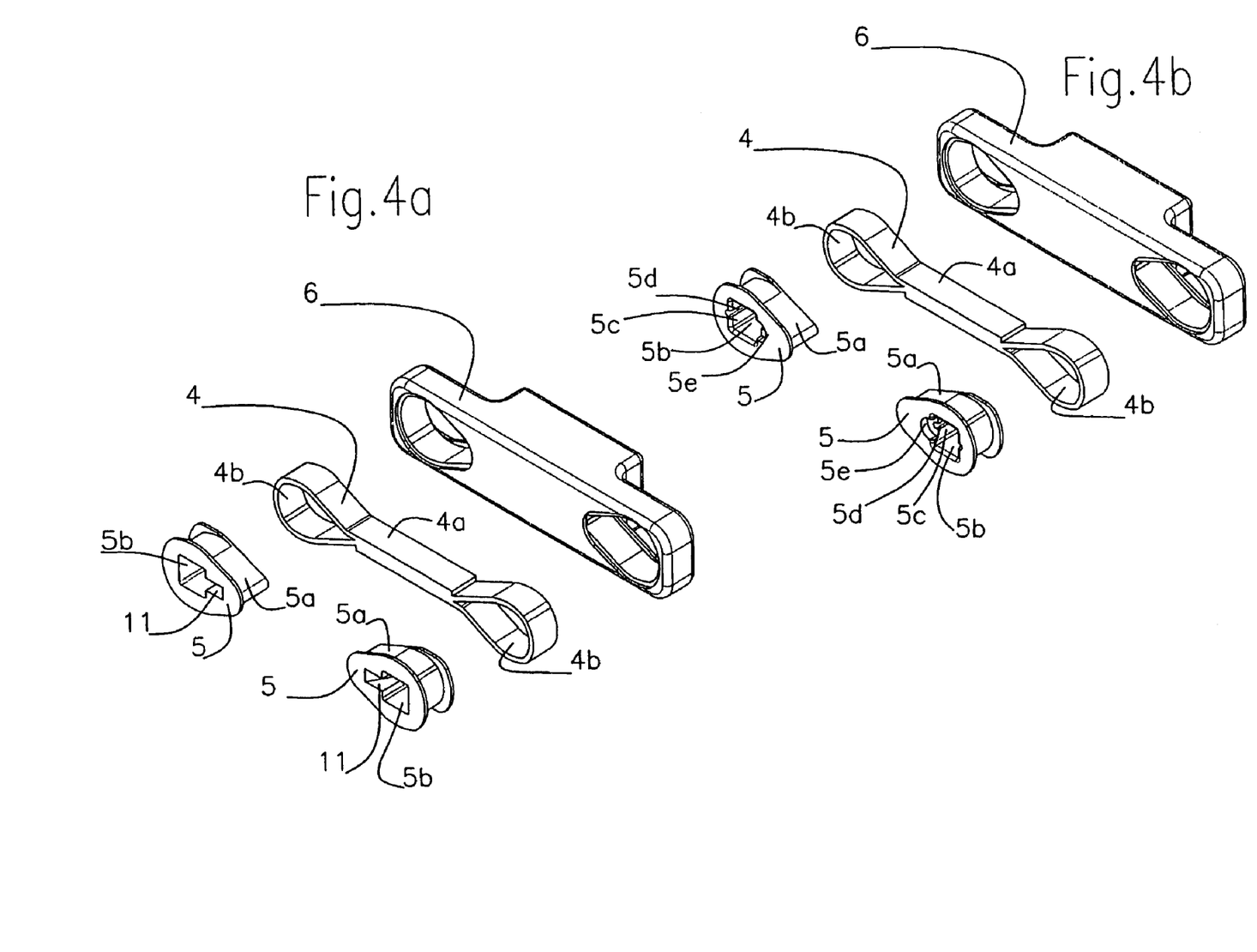
FIGS. 4A and 4B are exploded perspective views of the links shown in FIGS. 3A and 3B respectively.
Figure 5:
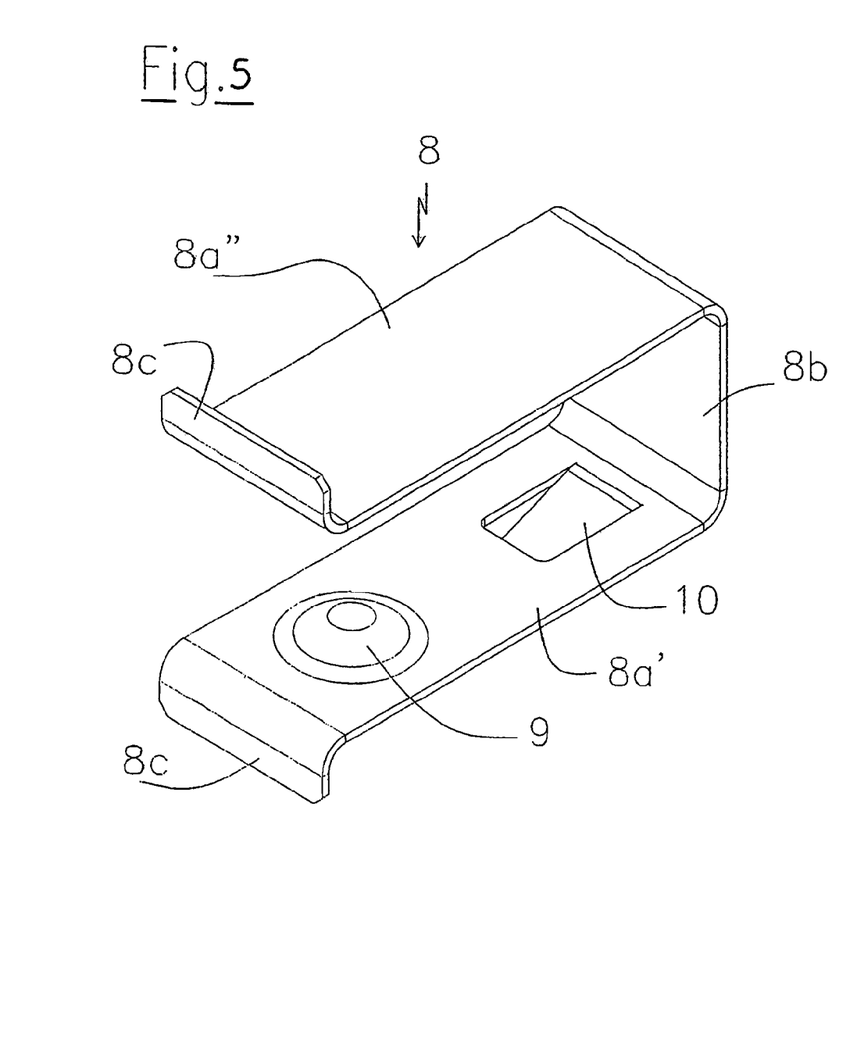
FIG. 5 is a perspective view, at a greater scale, of a fork-clip providing for the attachment of the bars onto the lateral chains, according to the first embodiment.
Figure 6:
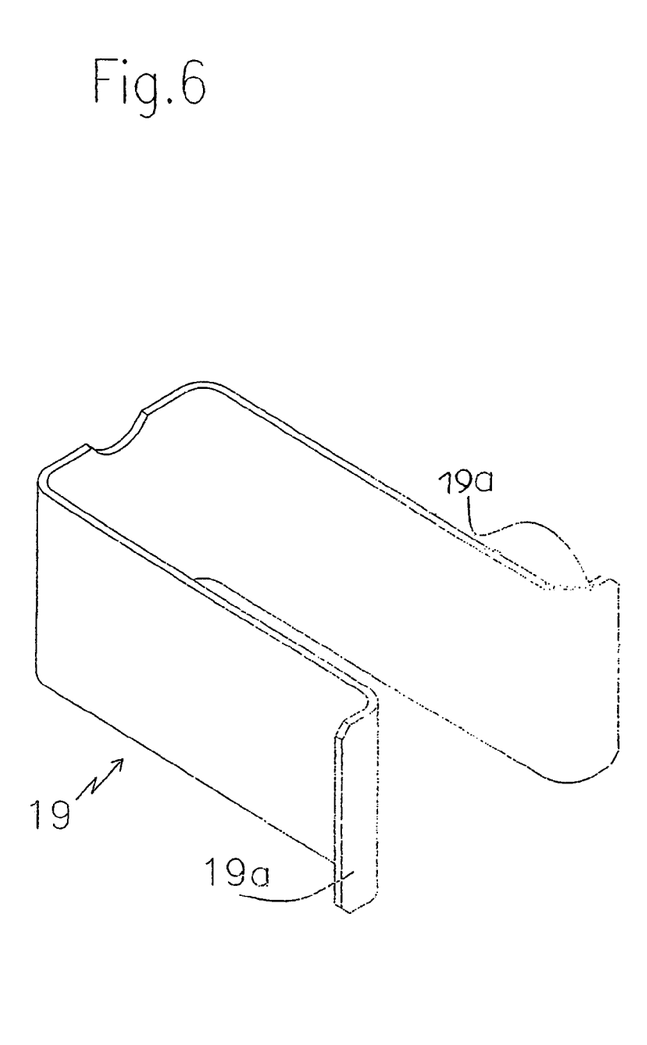
FIG. 6 is a perspective view of a fork used to ensure the positioning of the links on the bars according to the second embodiment.

The extreme portions 1*a* of bar 1 shown in FIG. 2*a* are provided with an indentation or cavity 7 to be used as explained below.

According to another characteristic arrangement, the bars 1 are attached in a removable manner to the flexible links 3 of the lateral chains 2.

According to an advantageous first embodiment, the removable attachment system of the bars 1 onto the flexible links 3 comprises a fork-clip 8 in U-shape consisting of two parallel flat branches 8*a*', 8*a*" and a bottom 8*b*. These fork-clips 8 lap over the extreme portions 1*a* of the bars 1. One of their branches (branch 8*a*' according to the attached drawings) is provided with means cooperating with a complementary arrangement of said extreme portions and ports 5*b* on eyelets 5 to make up the removable assembly of bars 1 and links 3.

Figure 7:
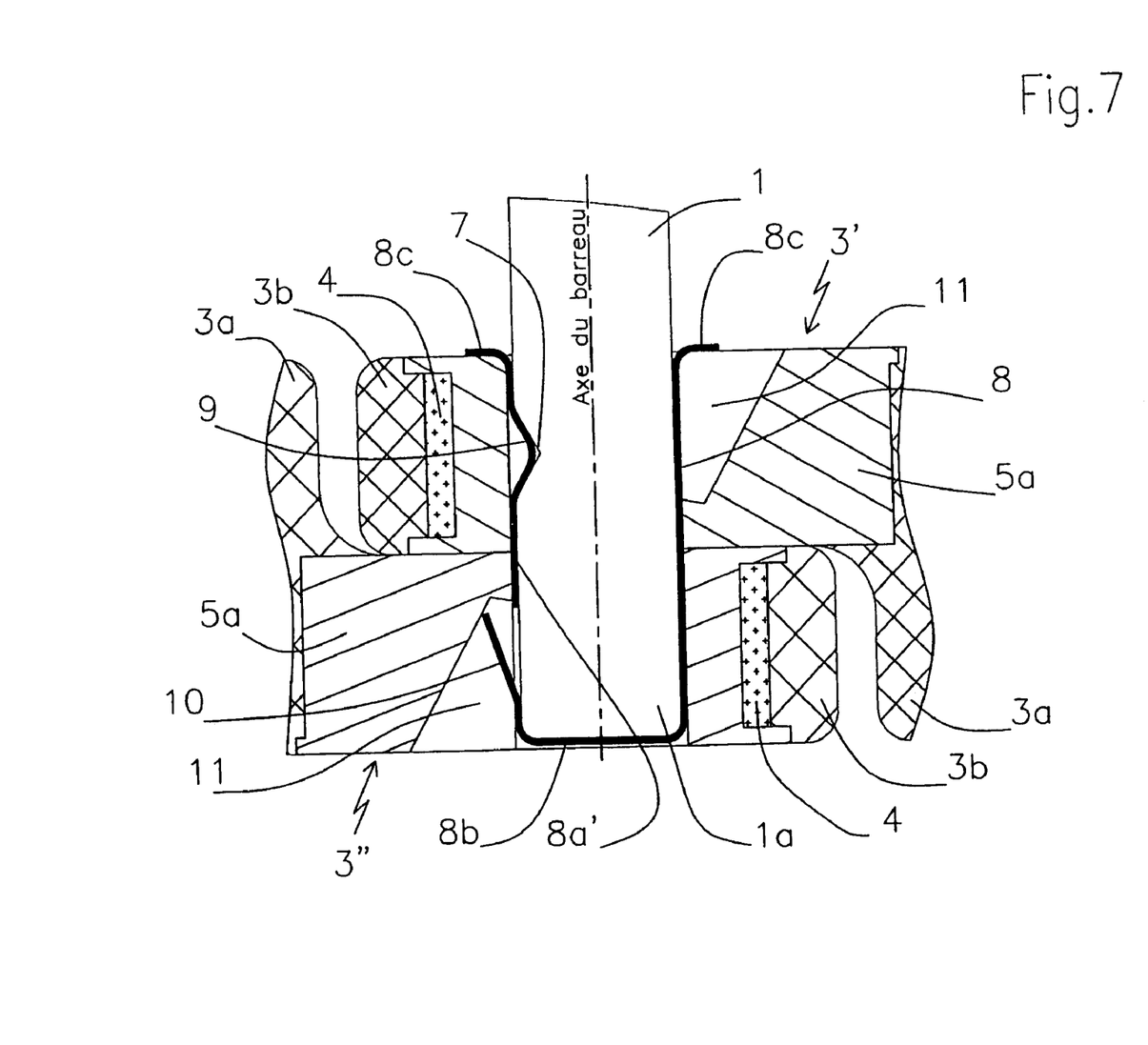
FIG. 7 is a cross-sectional view at a greater scale, showing the attachment of one of the ends of a bar onto two flexible links positioned in an inverse manner and connected by said bar, according to the first embodiment.
Figure 8A:
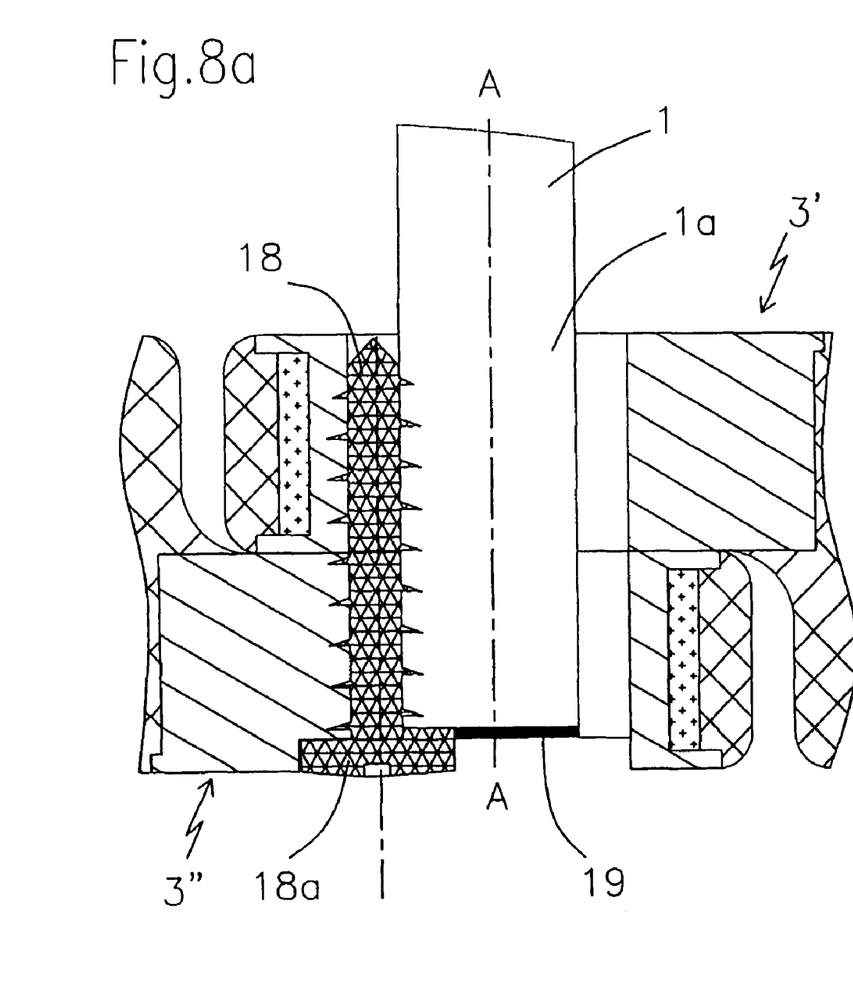
FIG. 8a is a cross-sectional view, similar to FIG. 7, showing the attachment of one of the ends of a bar onto two flexible links positioned in an inverse manner and connected by said bar, according to the second embodiment.
Figure 8B:
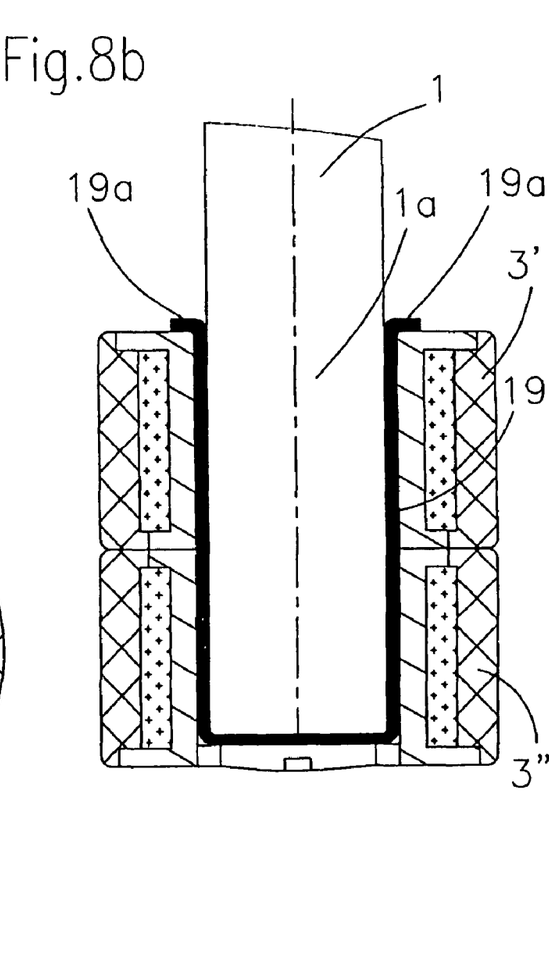

According to the embodiment shown, more specifically in FIGS. 4A, 5, 6 and 7, the open ends of the branches 8*a*', 8*a*" are bent outward so as to constitute a return 8*c*. The ends 3*b* of the internal links 3' rest against the returns 8*c* so that the latter oppose the transverse sliding of the internal links 3' and therefore also the sliding of the external links 3" in the direction of the central part of the conveyor (FIGS. 1A and 7).

According to this advantageous embodiment, the branch 8*a*' on the fork-clips 8 is equipped with a lug or boss 9 oriented inward of said forks and placed close to the open end of said branch. In the assembling position of bars 1 and links 3, this lug 9 fits in the indentation 7 provided on each extreme portion 1*a* of the bars 1 so as to prevent any axial movement of the fork-clips 8 in outward direction from the lateral chains, i.e., any accidental unseating of said fork-clips.

Branch 8*a*' of the fork-clips 8 is equipped with a flexible tab 10, for example achieved by cutting, said flexible tab protruding on the outside face of said branch and extending into the direction of the latter's open end. Furthermore, the internal surface of ports 5*b* on eyelets 5 is provided with a notch 11 opening onto the outside face of said eyelets. In the assembling functional position of bars 1 and links 3, the flexible tab 10 on the fork-clips 8 fits in the notch 11 on eyelets 5 of the external flexible links 3", thus preventing any transverse outward sliding of said external links and subsequently also of the internal links 3", mounted on the extreme portions 1*a* of the bars 1. The various components of the handling device are thus securely attached to one another.

For the mounting of this first embodiment of the handling device under the invention, the fork-clips 8 are first placed lapping over the terminal portions 1*a* of the bars 1 so that they rest against the end of the latter through their bottom 8*b*, while their boss 9 fits in the indentation 7 provided in said terminal portions so that said fork-clips are maintained on the latter. The internal links 3' are then shafted onto the extreme portions 1*a* of the bars 1 equipped with assembling fork-clips 8 until they butt against the returns 8*c* of said fork-clips. The external links 3" are then shafted onto the ends 1*a* of the bars, in an inverse position in relation to hat of the internal links 3', their locking on said bars being done automatically as soon as the locking tab 10 on the fork-clips engages through elasticity effect into the notch 11 made in the opening 5*b* of eyelets 5.

The removal of one or more flexible links 3 can be done easily and rapidly whenever the chain is no longer subject to traction. All that is needed is to "unclip" or release the flexible locking tab 10 of notch 11, for example using a non-dedicated screwdriver or a similar tool to be able to remove successively the external link 3", then if necessary, the internal link 3' by sliding it on the terminal portions 1*a* of the bars 1.

This simple removal and assembly capability makes it possible to replace one or more links and/or one or more bars quickly and easily.

The peculiar shape of the links and their alternatively reverse arrangement make it possible to achieve continuous chains occupying limited space.

According to the second advantageous embodiment of the handling device under the invention, as shown in FIGS. 1B, 3B, 4B, 8A and 8B, the removable attachment means for the bars 1 into the eyelets 5 of the flexible links 3 consists of a "under the skin" linking system comprising a self-tapping screw 18 screwing both into the end 1*a* of said bars and into the internal wall 5*c* delimiting the port 5*b* of said eyelets into which said end fits.

In order to facilitate the screwing of the connecting tapping screw 18, the internal wall 5*c* is provided with opposite guiding grooves 5*d* oriented parallel to the axis of the ports 5*b* and into which said screw is partially inserted. In addition, a dent or counterbore 5*e* into which one of the guiding grooves 5*d* runs, is provided in the external surface of the opposite extreme parts 3*a* of the links 3 to house the head 18*a* of the tapping screw 18 so that the chains 2 made of said links do not show any protuberance on their outside.

A U-shaped metallic fork 19 comprising two parallel flat branches is placed lapping over the opposite extreme portions 1*a* of the bars 1. The open ends of the branches of this fork 19 are bent outward so as to make up returns 19*a* against which the internal link 3' rests and thus opposing a transverse sliding of said internal link and of external link 3", in the direction of the conveyor central part. The presence of this thrust fork also has the advantage of increasing the lifetime of the assembly, especially when the bars are made of carbon fibers or of a similar material.

For the mounting of the device according of this second embodiment, the forks 19 are first placed lapping over the portions 1*a* of the bars 1 so that they rest against the ends of the latter through their bottom. The internal links 3' are then shafted onto the extreme portions 1*a* of the bars 1 until they butt against the returns 19*a* of said forks 19. The external links 3" are then shafted onto the ends 1*a* of the bars 1 in a reverse position in relation to that of the internal links 3'. The locking of the internal links 3' and external links 3" on the bars 1 is achieved using the tapping screw 18 screwed "under the skin", for example using a screwdriver.

It is understood that this mounting can be done quickly and easily. The same applies to the disassembly, for example, to replace one or more damaged links.

The conveyor under the invention can be driven in two ways: through adherence, or preferably and advantageously through positive drive.

Figure 10:
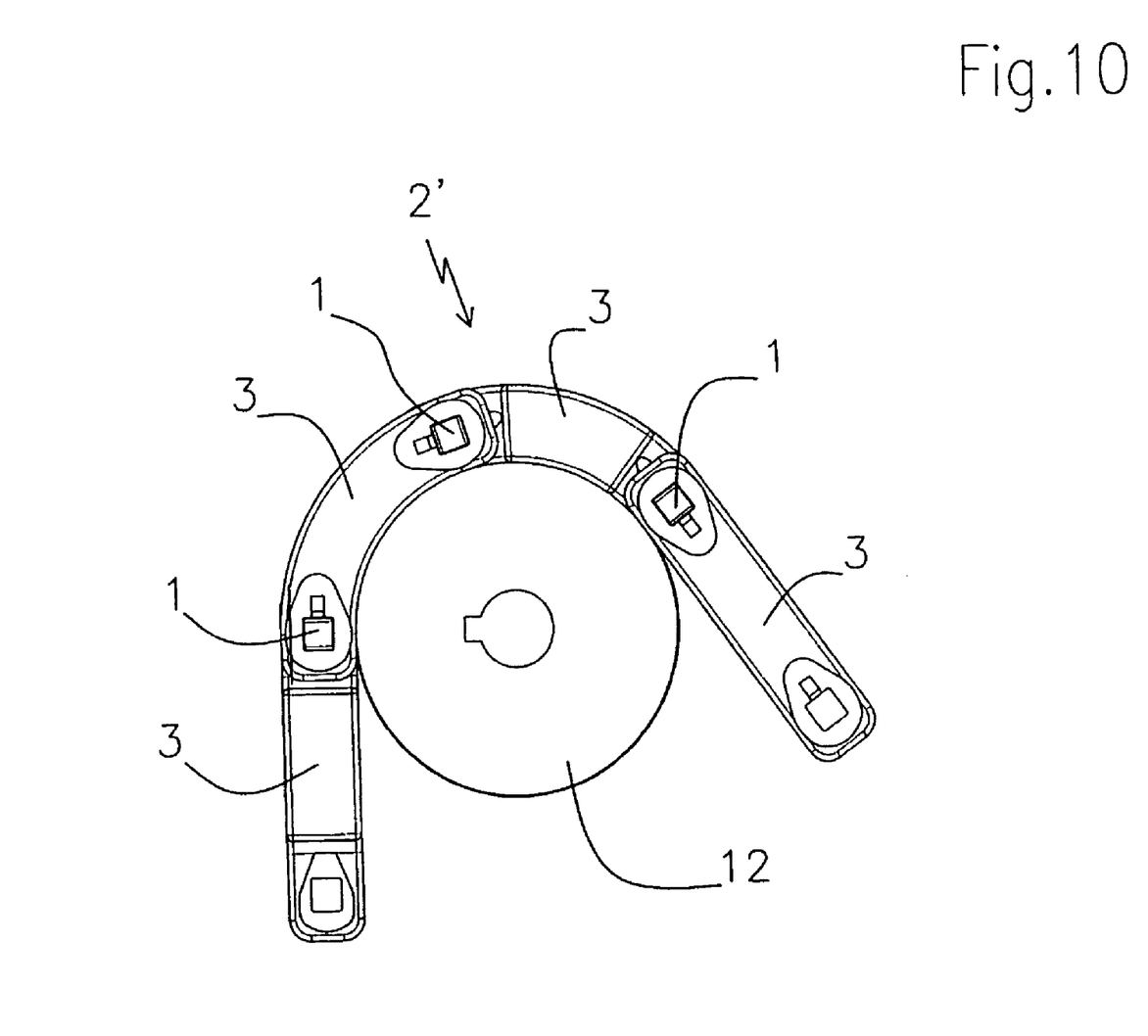
FIG. 10 is a partial schematic view similar to FIG. 9, showing the conveyor drive through adherence.

For adherence drive, the lateral chains 2' of the conveyor rest and wind onto smooth or not pulleys 12 (FIG. 10), for example made out of steel or rigid plastic. The connection between the pulleys 12 and the links 3 is achieved through adherence, in a manner comparable to a flexible link transmission.

Figure 9:
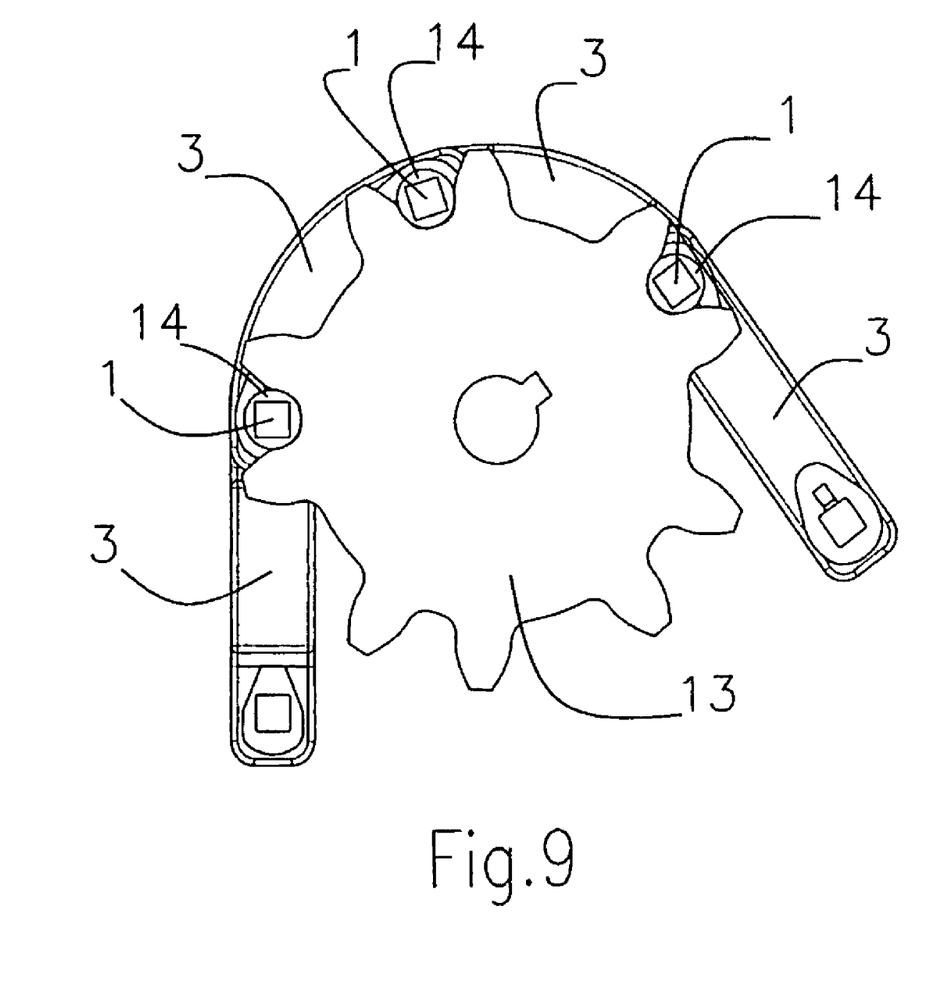
FIG. 9 is a partial schematic view showing the conveyor drive through a positive drive system.
Figure 11:
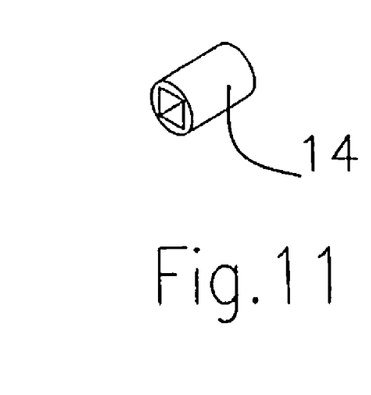
FIG. 11 is a perspective view of a brace positioned on the extreme portions of the polygonal-section bars, applicable to the embodiment using a positive drive system.

For positive drive, the principle of chain drive is used. In this case, the bars 1 of the conveyor mesh with sprockets 13 ensuring the conveyor drive. Whenever the bars have a polygonal section, for example square, cylindrical braces 14 (FIGS. 9 and 11) can be positioned on said bars to permit an adjustment between the section of the bars 1 and the section of the pinions 14 so as to achieve good meshing conditions of said bars and pinions and proper drive of the conveyor.

We claim:

1. A handling apparatus comprising:
    a plurality of bars extending in spaced relation to each other; and
    a pair of endless drive chains connected to said plurality of bars, said plurality of bars extending in transverse relation to said pair of endless drive chains, each of said endless drive chains comprising:
        a plurality of links in which a pair of adjacent links of said plurality of links are connected together by an end of the bar, one of said pair of adjacent links having an end overlying an end of another of said pair of adjacent links, said end of the bar received in a port formed in said ends of said pair of adjacent links such that said pair of adjacent links do not swivel with respect to each other at a linkage axis at said port in said ends of said pair of adjacent links, each of said plurality of links being flexible along a length thereof, each of said plurality of links comprising:
        an internal armature formed of a high tensile strength flexible braid, said internal armature having a loop at opposite ends thereof, said loop having a rigid eyelet received therein, said rigid eyelet having said port therein, said internal armature being covered with a flexible coating.

2. The handling apparatus of claim 1, the bar being removably affixed to the link.

3. The handling apparatus of claim 1, each of said plurality of links having a bulge on a lateral face thereof between an adjacent pair of said plurality of bars, each of said pair of endless drive chains having a generally uniform width.

4. The handling apparatus of claim 1, the end of each of said plurality of bars having a polygonal cross-section.

5. The handling apparatus of claim 1, further comprising:
    a component mounted fixedly to the bar between said pair of endless drive chains.

6. The handling apparatus of claim 1, further comprising:
    a component mounted in a tilted manner to the bar between said pair of endless drive chains.

7. The handling apparatus of claim 1, the end of the bar having a shape that is complementary to the shape of the port.

8. The handling apparatus of claim 2, further comprising:
    a U-shaped fork clip having a pair of flat branches and a bottom extending between said pair of flat branches, said fork clip affixed over the end of the bar.

9. The handling apparatus of claim 8, said fork clip having an open end opposite said bottom, each of said pair of flat branches having an end bent transversely at said open end.

10. The handling apparatus of claim 8, one of said pair of flat branches having a lug extending inwardly in a direction toward the other of said pair of flat branches, the bar having an indentation adjacent the end thereof, said lug cooperatively received in said indentation.

11. A handling apparatus comprising:
    a plurality of bars extending in spaced relation to each other; and
    a pair of endless drive chains connected to said plurality of bars, said plurality of bars extending in transverse relation to said pair of endless drive chains, each of said endless drive chains comprising:
        a plurality of links in which a pair of adjacent links of said plurality of links are connected together by an end of the bar, one of said pair of adjacent links having an end overlying an end of another of said pair of adjacent links, said end of the bar received in a port formed in said ends of said pair of adjacent links such that said pair of adjacent links do not swivel with respect to each other at a linkage axis at said port in said ends of said pair of adjacent links, each of said plurality of links being flexible along a length thereof, the bar being removably affixed to the link; and
    a U-shaped fork clip having a pair of flat branches and a bottom extending between said pair of flat branches, said fork clip affixed over the end of the bar, one of said pair of flat branches having a flexible tab protruding from an outer face thereof, said port having a notch formed on an internal surface thereof, said flexible tab cooperating with said notch.

12. The handling apparatus of claim 11, further comprising:
    a tapping screw threadedly secured to the end of the bar and to said port.

13. The handling apparatus of claim 12, said wall of said port having a groove extending parallel to an axis of said port, said tapping screw received partially in said groove.

14. The handling apparatus of claim 13, said groove having a counterbore formed at an outer face of the link.

15. The handling apparatus of claim 13, further comprising:
    a U-shaped metallic fork having a pair of parallel flat branches extending over the end of the bar, said pair of parallel flat branches each having an end bent transversely thereto so as to overlie an internal face of the link.

* * * * *